United States Patent
Monti et al.

(10) Patent No.: US 12,019,476 B2
(45) Date of Patent: Jun. 25, 2024

(54) WEARABLE DATA PROCESSING APPARATUS, SYSTEM AND METHOD

(71) Applicant: Sony Interactive Entertainment Inc., Tokyo (JP)

(72) Inventors: Maria Chiara Monti, London (GB); Matthew Sanders, London (GB); Pedro Federico Quijada Leyton, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 18/318,839

(22) Filed: May 17, 2023

(65) Prior Publication Data

US 2023/0384826 A1    Nov. 30, 2023

(30) Foreign Application Priority Data

May 25, 2022 (GB) .................................. 2207664

(51) Int. Cl.
*G06F 1/16* (2006.01)
*A63F 13/86* (2014.01)
(Continued)

(52) U.S. Cl.
CPC .............. *G06F 1/163* (2013.01); *A63F 13/86* (2014.09); *G06F 3/012* (2013.01); *G06F 3/016* (2013.01);
(Continued)

(58) Field of Classification Search
CPC .......... A63F 13/00; A63F 13/20; A63F 13/21; A63F 13/211; A63F 13/22; A63F 13/42; A63F 13/428; A63F 13/44; A63F 13/803; A63F 13/95; A63F 2300/1006; A63F 2300/105; A63F 2300/6045; A63F 2300/638; A63F 2300/8088; A63F 13/235;
(Continued)

(56) References Cited

U.S. PATENT DOCUMENTS

| | | |
|---|---|---|
| 2017/0061201 A1 | 3/2017 | Wexler |
| 2017/0131770 A1 | 5/2017 | Keller |

(Continued)

FOREIGN PATENT DOCUMENTS

| | | |
|---|---|---|
| WO | 2015127067 A1 | 8/2015 |
| WO | 2021067044 A1 | 4/2021 |

OTHER PUBLICATIONS

Extended European Search Report for corresponding EP Application No. 23171666.3, 7 pages, dated Oct. 20, 2023.

(Continued)

*Primary Examiner* — Nelson M Rosario
(74) *Attorney, Agent, or Firm* — Matthew B. Dernier, Esq.

(57) ABSTRACT

A wearable data processing apparatus includes one or more attachment members for attaching the wearable data processing apparatus to a part of a limb of a user, one or more sensors to generate user input data in response to one or more user inputs, wireless communication circuitry to transmit the user input data to an external device and to receive control data based on the user input data from the external device, processing circuitry to generate one or more output signals in dependence upon the control data and an output unit to output one or more of the output signals.

15 Claims, 3 Drawing Sheets

(51) Int. Cl.
*G06F 3/01* (2006.01)
*G06T 7/20* (2017.01)
*G06T 13/40* (2011.01)
*G06V 40/10* (2022.01)
*G06V 40/16* (2022.01)

(52) U.S. Cl.
CPC ............... *G06F 3/017* (2013.01); *G06T 7/20* (2013.01); *G06T 13/40* (2013.01); *G06V 40/107* (2022.01); *G06V 40/174* (2022.01)

(58) Field of Classification Search
CPC ...... A63F 13/212; A63F 13/218; G06F 3/011; G06F 3/017; G06F 3/033; G06F 3/0338; G06F 3/0346; G06F 3/038; G06F 3/0383; G06F 3/04815; G06F 2203/0382; G06F 2203/0384; G06F 3/03
See application file for complete search history.

(56) References Cited

U.S. PATENT DOCUMENTS

| | | | |
|---|---|---|---|
| 2017/0358141 A1* | 12/2017 | Stafford | G06T 11/60 |
| 2018/0292911 A1* | 10/2018 | Stafford | G06F 3/017 |
| 2018/0348531 A1 | 12/2018 | Nakahara | |
| 2019/0197843 A1 | 6/2019 | Levesque | |
| 2019/0212821 A1 | 7/2019 | Keller | |
| 2021/0096657 A1 | 4/2021 | D'Amone | |
| 2023/0325002 A1* | 10/2023 | Bicking | G06F 3/013 |
| | | | 715/863 |

OTHER PUBLICATIONS

Combined Search and Examination Report for corresponding GB Application No. 2207664.0, 9 pages, dated Jul. 11, 2022.

* cited by examiner

WEARABLE DATA PROCESSING APPARATUS, SYSTEM AND METHOD

BACKGROUND OF THE INVENTION

Field of the Invention

The present disclosure relates to wearable data processing apparatuses for use as an input/output device and related systems and methods.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In many processing arrangements it may be desirable to provide an apparatus that allows for intuitive user inputs for inputting commands to a processing device. Conventional controllers can be seen as being limiting in this respect, as the number of inputs is restricted by the number of buttons on the controller (or the complexity of using the controller is increased if the number of inputs is high) and having an action correspond to a button press may appear unintuitive to a user—especially in a virtual reality (VR) or augmented reality (AR) application, where users may expect more naturalistic interaction. Conventional controllers may decrease the sense of immersion that a user experiences when playing a game, for example, or at least limit the number or type of inputs that a user can use. Similarly, in some arrangements it may be desirable to allow intuitive inputs from another processing device as an alternative to or supplementing the inputs available via a conventional handheld controller.

A further arrangement that has been proposed is that of a glove (worn by a user) that is operable to detect hand motions as gestures. However using gloves may restrict the ability of the user to interact with physical objects, such as picking up a prop or a drink or the like. In addition to this, gloves that are able to detect hand gestures may need to be well fitted to the user's hand; therefore such gloves cannot be easily shared between a plurality of users and may be expensive to produce due to the more bespoke nature of the product. It is in the context of the above arrangements that the present disclosure arises.

Similarly, in some arrangements a user may wear an HMD to view images associated with an executing application (e.g. video game application), whilst an associated image may be displayed on a so-called social screen (such as a television) for displaying one or more images to one or more other playing users (e.g. using one or more controller devices) and/or one or more spectating users. It would be desirable to improve interaction by such users to either enhance participation or improve control for one or more aspects associated with a spectating experience.

It is in the context of the above arrangements that the present disclosure arises.

SUMMARY OF THE INVENTION

Various aspects and features of the present disclosure are defined in the appended claims and within the text of the accompanying description. Example embodiments include at least a data processing apparatus, a method, a computer program and a machine-readable, non-transitory storage medium which stores such a computer program.

BRIEF DESCRIPTION OF THE DRAWINGS

Embodiments of the disclosure will now be described with reference to the accompanying drawings, in which.

DESCRIPTION OF THE EMBODIMENTS

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
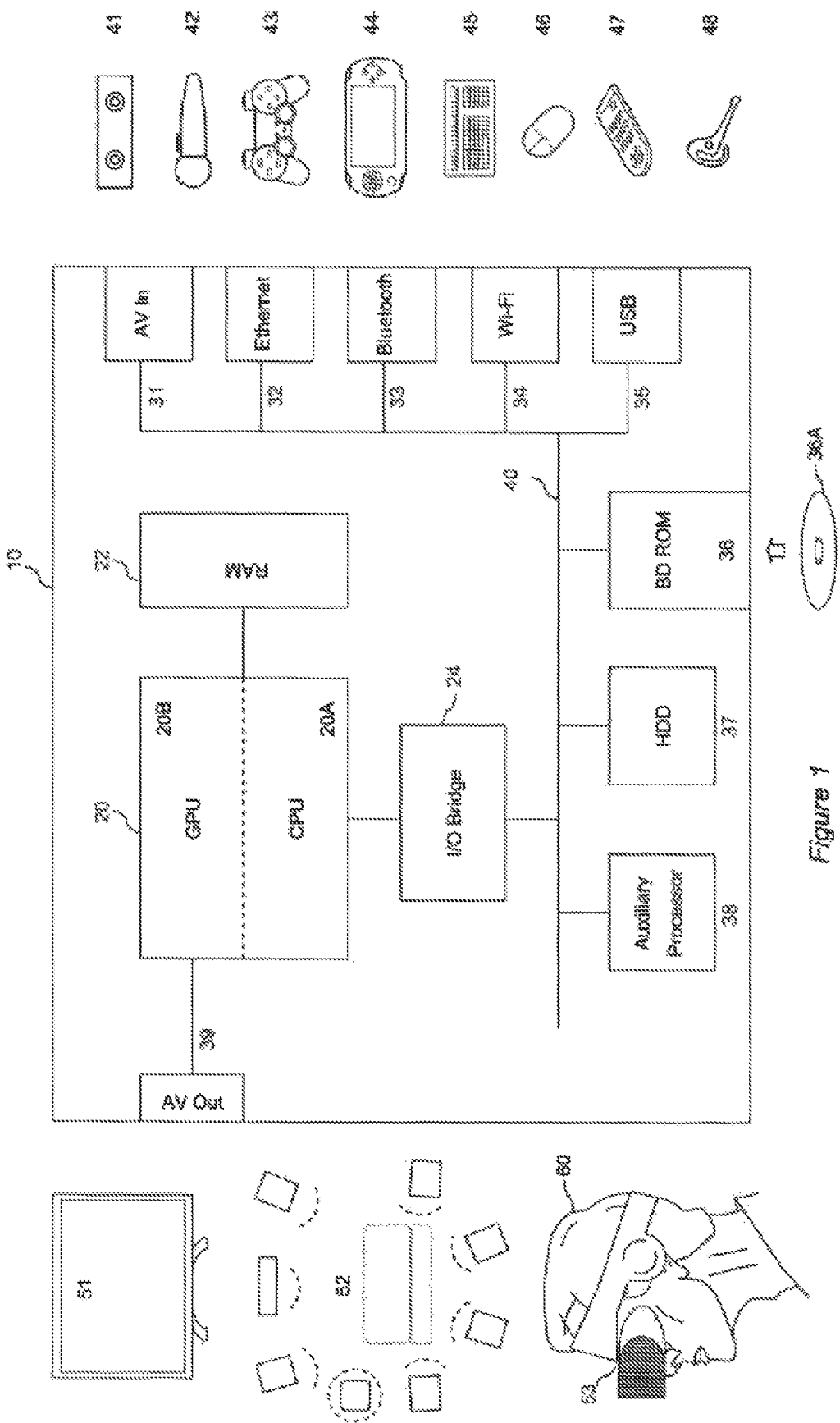
FIG. 1 is a schematic diagram illustrating a computer game processing apparatus.

Referring now to the drawings, wherein like reference numerals designate identical or corresponding parts throughout the several views, FIG. 1 schematically illustrates the overall system architecture of a computer game processing apparatus such as the Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4® or Dualsense®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, processes data and generates video images (image data) and optionally audio for output via the AV output 39. Optionally, the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 'HMD' 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

FIG. 1 therefore provides an example of a data processing apparatus suitable for performing processing operations for executing an application in accordance with user input data from one or more input devices and generating one or more images for display by a display unit (e.g. television 51) and optionally generating one or more audio signals.

Figure 2:
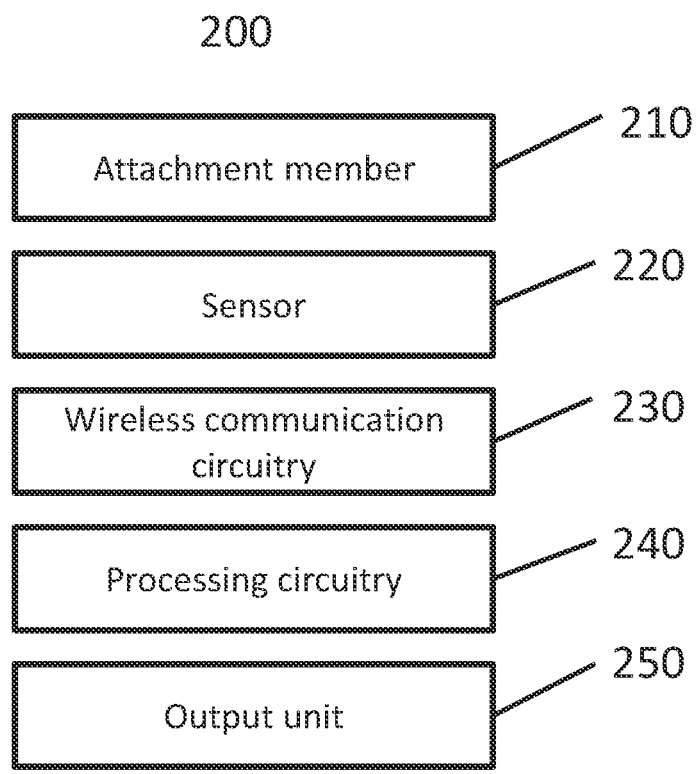
FIG. 2 is a schematic diagram illustrating a wearable data processing apparatus.

FIG. 2 schematically illustrates a wearable data processing apparatus 200 comprising one or more attachment members 210, one or more sensors 220, wireless communication circuitry 230, processing circuitry 240 and an output unit 250. The wearable data processing apparatus 200 is operable as an input/output device for use with a computing device such as that illustrated in FIG. 1. In embodiments of the disclosure, the wearable data processing apparatus 200 comprises one or more attachment members 210 for attaching the wearable data processing apparatus 200 to a part of a limb of a user; one or more sensors 220 to generate user input data in response to one or more user inputs; wireless communication circuitry 230 to transmit the user input data to an external device and to receive control data based on the user input data from the external device; processing circuitry 240 to generate one or more output signals in dependence upon the control data; and an output unit 250 to output one or more of the output signals.

The wearable data processing apparatus 200 is operable to transmit the user input data to an external device (e.g. a personal computer, laptop, games console or wireless access point) for use in updating a state of an application being executed by either the external device or another device in communication with the external device. The external device is not particularly limited and may in some examples correspond to an entertainment device, such as the device shown in FIG. 1, whilst in other examples the external device may be a wireless access point (e.g. a router) via for which communication with a server can be established, such that an application executed by a remote server can be executed in accordance with the user input data.

Alternatively or in addition the wearable data processing apparatus may communicate with the external device via an intermediary input device associated with the external device, such as handheld controller 43 or HMD 53, for example using a short range wireless protocol such as Bluetooth® to link to the input device. This has the benefit of using a lower-powered wireless communication protocol that is commonly available on wearable data processing apparatuses to communicate with an input device itself already communicating with the external device (or capable of doing so on request). The input device can then act as a bridge to the external device or (for example in the case of an HMD) may occupy some or all of the role of the external device itself, depending on the degree of local processing performed by the HMD. Optionally a dongle to be plugged into the controller or HMD (for example via a USB port) may provide the wireless communication with the wearable data processing apparatus and then communicate with the controller or HMD in a previously defined legacy manner through the port.

References herein to transmitting or receiving data between the wearable data processing apparatus and the external device may thus encompass any such reasonable communication route and combination of one or more communication means and protocols.

In any event, the wearable data processing apparatus 200 transmits the user input data and receives the control data, in which the control data is used by the wearable data processing apparatus 200 to generate one or more output signals for providing an interaction with the user. The control data is generated based on the user input data and is generated by either the external device or another device in communication with the external device. The received control data is used by the processing circuitry 240 to generate one or more output signals and the output unit 250 is operable to output one or more of the output signals to thereby provide one or more interactions with the user wearing the wearable data processing apparatus 200. Hence more generally, the wearable data processing apparatus 200 is operable as an input/output device in that user input data is generated in response to one or more user inputs and then transmitted, and control data that is generated by an external apparatus according to the user input data is received and used to generate one or more output signals for output to the user to thereby provide interaction for the user at the wearable data processing apparatus 200.

In some examples, a user may optionally wear the wearable data processing apparatus 200 whilst viewing an external display unit (e.g. a monitor such as the television 51) that displays one or more images generated by the external device. The user input data can be communicated from the wireless communication circuitry 230 to the external device (either directly or via one or more intermediate devices). As such, the external device may be operable to execute an application (such as a video game application) and to update a state of the application based on the user input data and the output unit 250 can output one or more signals to the user wearing the wearable data processing apparatus 200 whilst the user also views an external display unit associated with the external device. Therefore, the user wearing the apparatus 200 can view the external display unit associated with the external device and can also be provided with one or more interactions (e.g. audio and/or haptic and/or visual interaction) via the output unit 250 to enhance the user's experience.

Figure 3:
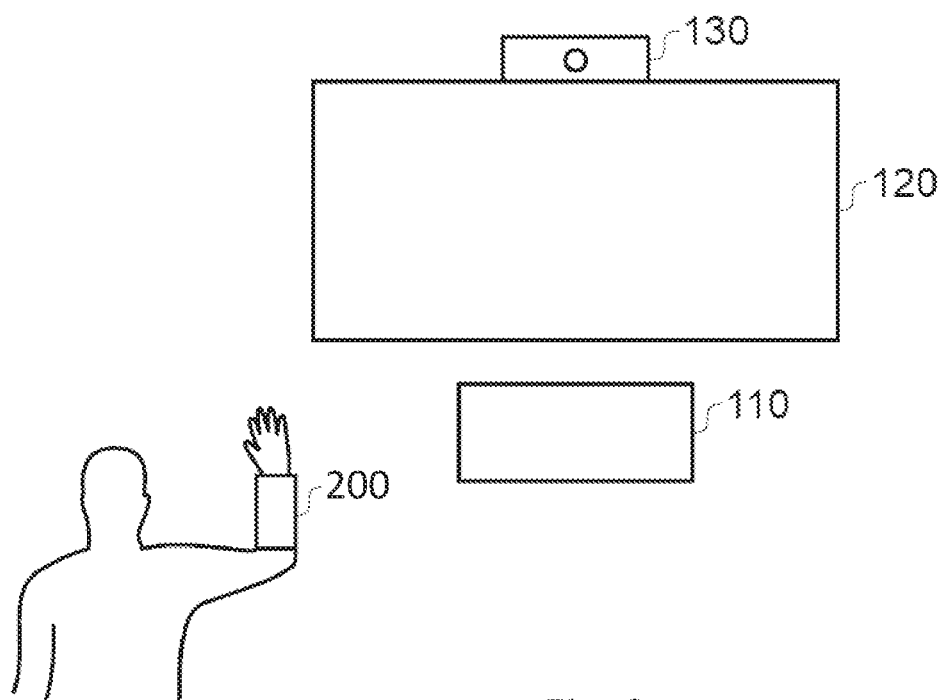
FIG. 3 schematically illustrates an example entertainment system.

FIG. 3 schematically illustrates an example entertainment system comprising the wearable data processing apparatus 200, a processing device 110, a display 120 and a camera 130. In the example of FIG. 3, the apparatus 200 is shown as being attached to a user's lower arm. However, the apparatus 200 may be attached to another portion of the user's arm or instead attached to a portion of a leg and the disclosure is not limited to the example arrangement shown in FIG. 3. In addition, the apparatus 200 may have a different form to that shown in the example of FIG. 3 and may in some examples be provided in the form of a watch-type device with one or more straps for attachment.

In some examples, a user may wear a first wearable data processing apparatus 200 on a first limb and wear a second wearable data processing apparatus 200 on a second limb. Hence, in some examples an entertainment system is provided in which the user wears a plurality of the wearable data processing apparatuses 200. For example, a first wearable data processing apparatus 200 may be attached to a first limb (e.g. an arm) and a second wearable data processing apparatus 200 may be attached to a second limb (e.g. the other arm or a leg). Alternatively or in addition, a plurality of wearable data processing apparatuses 200 may be attached to a same limb so that for example a first apparatus 200 is attached to an upper portion of the limb and a second apparatus 200 is attached to a lower portion of the limb and each apparatus 200 acts independently to generate user input data and transmit the user input data to the processing device 110. In some examples, the user may wear the wearable data processing apparatus 200 and tracked movements of the apparatus 200 may be used for controlling a limb of a virtual avatar in an application. The user may potentially control a plurality of virtual limbs using a plurality of the respective apparatuses 200.

In the example of FIG. 3, the user input data generated by the wearable data processing apparatus 200 is received by the processing device 110 for updating execution of an application at the processing device 110. As explained in more detail later, the user input data may be generated responsive to a user input such as one or more from the list consisting of: a movement associated with the limb wearing the apparatus 200, a movement associated with another limb of the user; one or more button presses (when the apparatus 200 comprises one or more buttons); and a voice input detected by a microphone. More generally, the one or more sensors 220 are operable to detect one or more user inputs and user input data indicative of one or more of the detected user inputs can be wirelessly transmitted for use in updating a state of an application.

The processing device 110 is operable to perform processing, such as executing a video game application or other application, for which the user input data can be used as an input. The processing device 110 may generate images that are to be output to the display 120.

The optional camera 130 is operable to capture one or more images of the wearable data processing apparatus 200 to allow image-based tracking of the apparatus 200. In order to assist with such tracking, the apparatus 200 may optionally comprises one or more optically detectable markers that may be imaged by the camera 130. In some embodiments of the disclosure, the apparatus 200 comprises one or more light sources arranged on an external surface for use in image-based tracking of the apparatus 200 by one or more external cameras such as the camera 130. In particular, one or more of the light sources may comprise at least one optically detectable infra-red light source for camera-based tracking of the wearable data processing apparatus 200.

In some examples, the wearable data processing apparatus 200 may be used by the user wearing the apparatus 200 to actively participate in a video game being executed by the processing device shown in FIG. 1, for example by controlling a portion (e.g. a limb or a portion thereof) of a virtual avatar in the video game according to the user input data. In this case, the control data transmitted to the wearable apparatus 200 may for example comprise data for generating an image for display by a display screen of the apparatus 200 (in the case that the apparatus 200 comprises a display screen) so that the user can view an image of an updated avatar via the screen of the apparatus 200. Alternatively or in addition, the control data may comprise haptic data for generating one or more haptic signals for output by a haptic interface unit of the device 200 so that the user is provided with a haptic interaction. The wearable data processing apparatus 200 optionally comprises a screen and/or a haptic interface unit.

Alternatively, rather than actively participating in a video game, the wearable data processing apparatus 200 may be used by the user wearing the apparatus 200 to spectate a video game, or other similar application, so that the user provides an input to the video game to either update a spectator viewpoint for the video game or request to switch between one viewpoint and another viewpoint (e.g. switch from one predetermined spectator viewpoint to another predetermined spectator viewpoint). Techniques for either actively participating in a video game or spectating a video game by using the wearable data processing apparatus 200 as an input/output device are discussed in more detail later.

Hence, in some embodiments of the disclosure a data processing system comprises: the wearable data processing apparatus 200; and an external device (e.g. processing device 110), wherein the external device is an entertainment device configured to: update a state of an application in dependence upon the user input data; and generate the control data in dependence upon the state of the application. The wearable data processing apparatus 200 can be configured to communicate directly with the entertainment device via a wireless communication such as Bluetooth®, ZigBee® or WiFi®, or as noted elsewhere herein, optionally via an intermediary input device that is in communication with the entertainment device. In this case, the data processing system may further comprise one or more such intermediary input devices.

Referring again to FIG. 2, the wearable data processing apparatus 200 comprises at least one attachment member 210 for attaching the data processing apparatus to a portion of a limb of a user. The attachment member(s) 210 can be made from a range of suitable materials having suitable strength and flexibility in order to releasably secure the wearable apparatus 200 to the user's limb, and examples of such materials include rubber, plastic or cloth or a combination thereof. It will be appreciated that an attachment member comprising other materials having suitable properties (flexibility and strength) can be provided in accordance with embodiments of the disclosure.

The wearable data processing apparatus 200 may for example be provided in the form of a watch-type device suitable for being worn on a wrist, or a forearm, or an ankle. The wearable data processing apparatus 200 may be provided in the shape of a cuboid or other three-dimensional shape (optionally with one or more rounded corners). The wearable data processing apparatus 200 may be similar in shape to that of a typical smartphone or smartwatch, and suitable for being attached to any portion of a user's limb using one or more of the attachment members 210.

The wearable data processing apparatus 200 may be attached to any of a lower portion of an arm, an upper portion of an arm, a lower portion of a leg and an upper portion of a leg. In some examples, the wearable data processing apparatus 200 may be attached to a joint portion of a limb (e.g. knee, ankle, elbow, shoulder) for allowing tracking of a joint portion of a limb. Specifically, in some examples the wearable data processing apparatus 200 is configured to be worn on a wrist portion of a user's arm. In other examples, examples the wearable data processing apparatus 200 is configured to be worn on an ankle portion of a user's leg. While this disclosure generally discusses the wearing of such an apparatus 200 on the user's arm, it would be immediately apparent to the skilled person upon reading this disclosure that the apparatus 200 may be worn on any part of a limb; an example being a device that is wearable on the user's leg that is able to detect motion of the portion of the user's leg. In the case where the device 200 is worn on a distal part of a limb (e.g. on or proximate to an ankle or wrist), the device 200 can be used for detecting motion of a distal portion of the limb to thereby allowing tracking of the user's hand or foot.

The attachment member 210 may comprise one or more straps made of an elastically deformable material and suitably sized for a circumference of a user's limb. Alternatively, the attachment member 210 may comprise a strap made of a textile material or leather or an elastically deformable material and with a suitable mechanism for shortening an effective length of the strap to allow for attachment to the user's limb. In some examples, the wearable device 200 comprises two or more attachment members and a mechanism for fastening the attachment members. In some examples, a watch strap such as that used on many smartwatches may be used as the attachment member 210.

The wearable data processing apparatus 200 comprises at least one sensor 220 configured to generate user input data in response to one or more user inputs by a user wearing the wearable data processing apparatus 200. The wearable data processing apparatus 200 may comprise one or more user actuated input units on an external surface which can be individually actuated by a user's digit for providing a user input. For example, an external surface of the device 200 may comprise a plurality of respective buttons that can be operated by a user's digit to activate a switch associated with the button. More generally, the wearable data processing apparatus 200 may comprise one or more pressure sensitive switches capable of being individually actuated by a user's digit. Alternatively or in addition, the wearable data processing apparatus 200 may comprise one or more pressure sensors for detecting a magnitude of a pressure applied to a surface and generating data indicative of the magnitude of the pressure being applied. For example, a pressure sensor may comprise one or more of a capacitance pressure sensor, resistance pressure sensor, piezoresistive pressure sensor, piezoelectric pressure sensor, optical pressure sensor, and/or an elastoresistive pressure sensor. Alternatively or in addition, the wearable data processing apparatus 200 may comprise a touch pad for detecting a touch input. Alternatively or in addition, the wearable data processing apparatus 200 may comprise a touch screen for detecting a touch input. Hence more generally, the wearable data processing apparatus 200 may comprise one or more sensors configured to detect one or more pressure based inputs associated with a user's hand and generate user input data indicative of one or more pressure based inputs.

As explained in more detail below, in some embodiments of the disclosure the wearable data processing apparatus 200 comprises one or more sensors for detecting motion of the apparatus 200. The one or more sensors operable to detect motion of the apparatus 200 may comprise one or more from the list consisting of: one or more gyroscopes; one or more accelerometers; and one or more magnetometers. Other sensors may similarly be considered. Generally, the one or more sensors operable to detect motion may comprise any suitable sensor operable to detect relative changes in a magnetic field and/or to detect a magnitude and a direction of acceleration in its own rest frame. The one or more motion sensors may for example comprise a three-axis accelerometer (optionally being an MEMS accelerometer) and a three-axis gyroscope. The three-axis accelerometer can be used to detect changes in position with respect to three spatial axes and the three-axis gyroscope can be used to detect changes in orientation with respect to three spatial axes to thereby provide six degrees of freedom (6DOF) tracking. Hence more generally, motion of the data processing apparatus 200 worn on the user's limb can be detected such that the apparatus 200 can be used by the user to provide one or more motion-based user inputs. Hence, changes in a position and/or orientation of the apparatus 200 when worn by a user can be detected and user input data indicative of the detected motion can be generated.

The wearable data processing apparatus 200 comprises wireless communication circuitry 230 configured to transmit the user input data to an external device and/or intermediary input device of the external device, and to receive control data based on the user input data from the external device and/or intermediary input device of the external device. The wearable data processing apparatus 200 is thus operable, using the wireless communication circuitry 230, to directly and/or indirectly wirelessly communicate with an external processing device such as a games console, personal computing device or a wireless access point. Any suitable wireless communication may be used such as WiFi®, Bluetooth® or ZigBee® or cellular network communications. More generally, the wearable data processing apparatus 200 generates user input data responsive to one or more user inputs (e.g. motion of the user's limb and/or button presses) and wirelessly transmits the user input data to an external device. The external device may be a processing device (e.g. a games console) for executing an application (e.g. a VR application such as a video game application or an application for training healthcare professionals such as surgeons) such that the external device executes the application in dependence on the user input data. Alternatively, the external device may be an intermediate device (e.g. a router) that forwards the user input data to another processing device such as a remote server or another processing device that executes an application in dependence upon the user input data. Hence more generally, the external device (or another processing device that communicates with the external device) is configured to update a state of an application in dependence upon the user input data and to generate control data in dependence upon the state of the application, and the control data is wirelessly received by the wearable apparatus 200.

The wearable data processing apparatus 200 comprises processing circuitry 240 to generate one or more output signals in dependence upon the control data received by the wireless communication circuitry 230, and the output unit 250 is operable to output one or more of the output signals generated by the processing circuitry 240 to thereby provide one or more user interactions. Generally, the control data may comprise one or more of image data, audio data and haptic data, and the processing circuitry 240 is operable to generate one or more output signals in dependence upon the control data. Hence, one or more of a visual, audio and haptic interaction can be provided to the user.

In some embodiments of the disclosure, the one or more sensors 220 comprise at least one of: one or more motion sensors to detect motion of the data processing apparatus; and one or more image sensors configured to capture one or more images. As explained previously, one or more motion sensors may be provided for detecting changes in a position and/or orientation of the apparatus 200. The one or more motion sensors can thus track changes in the position and/or orientation of the apparatus 200 and generate user input data indicative of changes in the position and/or orientation. Hence, user input data indicative of a change in position and/or orientation can be communicated to the external device for use in updating a state of an executing application.

Alternatively or in addition to using one or more hardware motion sensors, the apparatus 200 may comprise one or more image sensors configured to capture one or more images. One or more images sensors may be arranged on an external surface of the apparatus 200 to capture one or more images for use in detecting motion of the apparatus 200 and/or for use in detecting one or more body parts of the user. An image sensor can be provided at any suitable location on a surface of the apparatus 200 so that when the apparatus 200 is attached to the user's limb, the image sensor is configured to capture one or more images including features in the user's surrounding environment and/or one or more parts of the user's body. Generally, at least one image sensor is arranged on a surface that faces away from the user's limb when the apparatus is attached to the user's body. For example, a lower surface intended to contact the user's limb when worn may have a rubberised coating, and an upper surface that is opposite to the lower surface may comprise one or more image sensors.

Figure 4A:
FIGS. 4*a* and 4*b* schematically illustrate examples of an exterior appearance of the wearable data processing apparatus.
Figure 4B:

FIGS. 4a and 4b are schematic diagrams illustrating examples of an exterior appearance of the wearable data processing apparatus 200 (in the schematic diagrams the attachment member(s) are not shown for the purposes of clarity of illustration). FIG. 4a illustrates an example of three dimensional shape in which a face is provided on the upper surface 410 so as to face away from the user's limb when the apparatus 200 is attached to the user's limb. FIG. 4b illustrates an example in which the face provided on the upper surface 410 is circular or ovoidal in shape. The wearable data processing apparatus 200 may generally comprise a circular, oval, square or rectangular shaped face on the upper surface 410. The face may take any suitable polygonal shape, such as a triangular face or a hexagonal face and optionally may have one or more rounded corners. The face may optionally comprise a display unit for displaying one or more images in dependence upon an image signal generated by the processing circuitry 240. Any suitable display technology may be used and the display unit may optionally comprise one or more touch sensors, such as a capacitive touch screen. A bezel 420 may be provided as shown in FIGS. 4a and 4b so as to extend around the face. In some examples, the bezel may have an upper portion to present a rim that is raised with respect to the face (not shown in FIGS. 4a and 4b).

One or more image sensors may be arranged on a surface of the bezel. In particular, one or more image sensors may be disposed on the upper portion of the bezel so as to face in a direction away from the surface 410 with an optical axis that is substantially perpendicular to the surface 410 (that is, with an optical axis directed upwards in the schematic diagrams of FIGS. 4a and 4b). In other words, the optical axis may be arranged to be substantially coincident with a normal of the surface 410. Alternatively or in addition, one or more image sensors may be disposed on the surface 410 itself so that an optical axis is substantially perpendicular with respect to the surface 410. Hence more generally, the wearable device 200 may comprise at least one image sensor arranged with an optical axis that is substantially perpendicular to the upper surface 410 of the wearable device 200. This may be particularly beneficial when the image sensor is to be used for capturing one or more images of the surrounding environment for use in detecting motion of the apparatus 200. The arrangement of the image sensor in this way can facilitate capturing of images of the surrounding environment without obstruction by the user's body, so that the captured images preferably comprise one or more static features (e.g. corners of a room, or a light fitting on a ceiling and/or stationary objects) which can be used for simultaneous localisation and mapping (SLAM). SLAM based techniques using a plurality of images of an environment captured from a plurality of respective viewpoints are generally known and are not discussed in detail. Generally, movement of the apparatus 200 due to movements of the user's limb is such that a plurality of images can be captured with a plurality of different viewpoints and static features in the surrounding environment can be captured from different viewpoints for use in building a mapping for the surrounding environment. Hence, an internally consistent set of data defining the respective camera viewpoints and the three-dimensional positions of the points can be obtained for mapping the surrounding environment. Accordingly, SLAM attempts to build a map or model of an unknown scene and estimate a camera position within that map based on an image captured by the camera. Consequently, using both the generated mapping and a captured image (e.g. a current image), one or more static features in the captured image can be used to determine the location of the viewpoint for the capture image, and thus the location of the apparatus 200, with respect to the surrounding environment so that movement of the apparatus 200 can be tracked.

In some examples, an entertainment system comprises the wearable data processing apparatus 200 and the external device, and further comprises one or more optically detectable markers (e.g. AR markers). The user can position the one or more optically detectable markers on one or more static features in the surrounding environment for assisting in detecting static features in images captured by the one or more images sensors of the wearable data processing apparatus 200.

In some examples, the wearable device 200 may comprise at least one image sensor arranged with an optical axis that is inclined at an angle in the range 10-80 degrees with respect to the upper surface 410 of the wearable device 200. An image sensor may be arranged to have the optical axis (being an axis corresponding to the centre of the field-of-view) inclined with respect to the upper surface 410 so as to preferentially direct the optical axis towards a position that is expected for a user's head when the apparatus 200 is worn on a lower or upper portion of the arm. For example, an image sensor may be arranged on the upper surface 410 and with an optical axis inclined at an angle in the range 10-80 degrees, or more preferably 30-60 degrees with respect to the upper surface 410. In this way, the likelihood of capturing an image including the user's face can be improved. Images of the user's face may be processed for detecting an emotional expression for the user, as discussed in more detail below.

In some embodiments of the disclosure, one or more image sensors can be disposed on a surface of the bezel 420 that is substantially perpendicular to the upper surface 410. A side-surface of the bezel that extends from the upper surface 410 to the lower surface and is thus inclined at an angle with respect to the upper surface 410 and the lower surface may have one or more image sensors disposed thereon. The bezel 420 may have a ring shape as shown in FIG. 4b and a plurality of image sensors may be disposed on the side-surface of the bezel 420. In the example, shown in FIG. 4*a*, the bezel 420 has four side-surfaces and in some examples, each side-surface may comprise a respective image sensor. In particular, when the apparatus 200 is worn on a portion of a left-sided limb (e.g. left wrist) one or more images sensors on the side-surface of the bezel facing away from the user's body (e.g. in a forwards direction away from the user and/or in a leftward direction to the user's left) may be beneficial for capturing images of the surrounding environment for use in SLAM based tracking. Conversely, when the apparatus 200 is worn on a portion of a left-sided limb (e.g. left wrist) one or more images sensors on the side-surface of the bezel facing towards the user's body (e.g. facing in a rearwards direction towards the user and/or in a rightward direction towards the right-sided limb) may beneficial for capturing images including other parts of the user's body for use in detecting a movement (e.g. a gesture) performed by another body part.

Hence more generally, one or more image sensors can be arranged on at least one external surface of the wearable apparatus 200 to capture one or more images and the arrangement of the image sensor(s) can facilitate capturing of images of the surrounding environment without obstruction by the user's body and/or capturing of images of the user's body.

In some embodiments of the disclosure, at least one image sensor is configured to capture one or more images for detecting motion of the data processing apparatus 200. One or more such images may be captured using any of the image sensor arrangements discussed above. Image analysis can be performed on the images to detect motion of the wearable apparatus 200 with respect to the surrounding environment. Whilst in some cases the image analysis for motion detection may be performed by the wearable apparatus 200, more preferably the one or more captured images are transmitted to the external device for analysis by the external device (or another associated processing device). Known tracking and mapping processing using images of an environment may be used for detecting the motion of the apparatus 200 based on one or more of the captured images. Generally speaking, one or more feature detection algorithms, such as Features from Accelerated Segment Test (FAST) and the Harris corner detection algorithm, may be used to detect feature points in the images and existing Simultaneous Localisation and Mapping (SLAM) algorithms may be used for tracking changes in the position and/or orientation of the wearable apparatus 200.

In some embodiments of the disclosure, the user input data is indicative of motion of the data processing apparatus detected by one or more of the motion sensors and/or one or more of the image sensors. One or more of the sensors 220 may generate user input data indicative of changes in position and/or orientation of the wearable apparatus 200. Therefore, when the wearable apparatus 200 is attached to a portion of a user's limb such that movement of the limb causes a corresponding movement of the apparatus 200, the user input data can be used to track the portion of the user's limb and can thus indicate a gesture associated with the limb of the user.

In some examples, the user input data is indicative of a predetermined gesture associated with the limb of the user to which the apparatus 200 is attached, wherein the gesture is determined based on the motion of the data processing apparatus 200 detected by one or more of the motion sensors and/or one or more of the image sensors. Processing may be performed either by the wearable apparatus 200 or the external device, or a combination thereof, to determine a predetermined gesture based on the motion of the wearable apparatus 200. For example, the wearable apparatus 200 may determine a predetermined gesture from a plurality of predetermined gestures based on the detected motion, and generate user input data indicative of the predetermined gesture. In particular, the wearable apparatus 200 may use the detected motion and a look-up table that maps respective motions to respective predetermined gestures so as to determine a predetermined gesture corresponding to the detected motion. Consequently, rather than transmitting user input data indicative of a change in position and/or orientation, the wearable apparatus 200 may transmit user input data indicative of a predetermined gesture. In this case, the user input data may comprise one or more values corresponding to a predetermined gesture that has been determined by the wearable apparatus 200, and the external device may receive the user input data and use a look-up table for mapping the one or more values to a corresponding gesture. Alternatively, processing for determining a gesture may be performed at the external device (or another device in communication with the external device). In particular, user input data indicative of motion of the data processing apparatus 200 may be received by the external device and using a look-up table that maps respective motions to respective predetermined gestures, the external device can be configured to determine a predetermined gesture corresponding to the received user input data.

In some embodiments of the disclosure, at least one image sensor is configured to capture one or more images including at least one of a torso of the user, a part of another limb of the user and a head of the user. As explained above, the wearable apparatus 200 may comprise at least one image sensor operable to capture images of a portion of the user's body when the apparatus 200 is worn on a user's limb. For example, when the apparatus 200 is worn on a left arm, one or more of the captured images may comprise a portion of the right hand, a portion of the right arm, a portion of the right leg, a portion of the right foot, a portion of the left leg, a portion of the left foot, a portion of the torso and/or a portion of the user's head. For example, a motion of the user's right arm in the captured images can be detected and/or a motion of the user's right hand may similarly be detected. In this way, images captured by the wearable data processing apparatus 200 attached to one limb can be used to detect motion of a portion of another limb of the user. In some examples, the user input data transmitted by the wearable apparatus 200 comprises one or more images including a portion of another limb of the user, and processing for detecting a gesture in the images can be performed at the external device side. Alternatively, in some cases processing for detecting a gesture in the images may be performed by the wearable apparatus 200 to detect a predetermined gesture from a plurality of predetermined gestures and user input data indicative a recognised predetermined gesture can be transmitted by the wearable apparatus 200. Hence in some cases the transmitted user input data comprises one or more images indicative of a gesture or in some cases the transmitted user input data is indicative of a gesture that has been recognised. For example, the user input data may comprise one or more values, and a look-up table at the external device can be used to determine a gesture corresponding to the received user input data, similar to that discussed above. Hence, in some embodiments of the disclosure the external device is configured to receive the user input data and to determine a gesture in dependence upon the received user input data.

In some embodiments of the disclosure, the user input data is indicative of one or more from the list consisting of: a predetermined user emotion selected from a plurality of predetermined user emotions in dependence upon a facial expression of the user in one or more of the captured images; a gesture associated with the another limb of the user included in one or more of the captured images; a gesture associated with both the another limb of the user included in one or more of the captured images and the limb of the user; a movement associated with the torso of the user included in one or more of the captured images; and a movement associated with the head of the user included in one or more of the captured images. References herein to the user input data being indicative of a predetermined user emotion and/or gesture refer to the user input data either directly indicating a predetermined user emotion and/or gesture that has been determined by the apparatus 200 or indicating a predetermined user emotion and/or gesture that is to be determined at the external device (or an associated device) on the basis of the user input data.

As explained above, one or more images captured by an image sensor of the wearable apparatus 200 may include portions of the user's body other than the portion of the user's limb to which the wearable apparatus 200 is attached. One or more of the images sensors can be operable to capture an image including a face of the user when the apparatus 200 is worn on a user's limb. For example, when attached to a wrist portion, one or more image sensors may have a field of view which includes a location typically expected for a user's head. Alternatively or in addition, due to movements of the user's limb a face of the user may come into a field of view of an image sensor for a period of time sufficient to allow one or more images to be captured that include the user's head. For example, a user may raise their hand resulting in a field of view for a respective image sensor being moved to encompass the user's head. More generally, the wearable device 200 comprises one or more image sensors operable to capture one or more images including the user's face. The transmitted user input data may comprise one or more images including the user's face for use by the external device to identify a predetermined emotion using one or more image recognition algorithms. Alternatively, the user input data may comprise a predetermined emotion that has been identified by the wearable apparatus 200 using one or more image recognition algorithms. Image recognition can be performed to detect one or more properties of the face in a captured image and identify a predetermined emotion from a plurality of predetermined emotions. For example, facial recognition algorithms may be used to detect a predetermined emotion such as neutral, happiness, sadness, anger, fear and disgust among others. Processing for identifying a predetermined emotion based on one or more captured images may be performed either by the wearable apparatus 200 or the external device. In some examples, a combination of the two may be used so that the wearable apparatus 200 performs processing to detect a face in a captured image, and extracts image data for a detected face portion, and transmits the image data for the face portion to the external device for processing at the external device to identify an emotion for the received image data. Alternatively or in addition to identifying a user emotion, captured images including the user's head may be used to detect one or more movements associated with the user's head, such as a head shake or a nod.

Hence, in some examples one or more processing operations may be performed by the apparatus 200 to detect an image portion (e.g. a face portion, limb portion and/or torso portion) in one or more images including a body part for the user and extract the image data for the image portion and transmit the extracted image data so that processing can be performed at the external device (or another associated device) to determine a gesture based on the extracted image data. In this way, a data size associated with the user input data communicated by the data processing apparatus 200 may be reduced by transmitting an extracted image portion rather than transmitting an entire image.

Similarly, one or more images captured by an image sensor of the wearable apparatus 200 may include a portion of a torso of the user and/or another limb of the user. One or more of the image sensors can be operable to capture an image including another limb of the user when the apparatus 200 is worn on the user's limb. For example, when attached to a wrist portion of a first arm, one or more image sensors may have a field of view which includes a location typically expected for a hand portion, wrist portion, lower arm portion and/or upper arm portion of the user's other arm. Similarly, when attached to a portion of a first leg, one or more image sensors may have a field of view which includes a location typically expected for a foot, knee, lower leg and/or upper leg of the user's other leg. Alternatively or in addition, movements of the user's limb (e.g. rotations and/or positional changes) may result in a portion of the other limb coming into the view of an image sensor for a period of time sufficient to allow one or more images to be captured for the other limb. Hence, using one or more images including portions of the user's body, movements associated with other parts of the user's body can be identified. In some examples, processing may be performed at the wearable apparatus 200 to identify a gesture. Alternatively, processing may be performed at the external device to identify a gesture using one more images received from the apparatus 200. In some examples, a combination of the two may be used to that the wearable apparatus 200 performs processing to detect presence of a limb in a captured image and transmits image data for a limb portion in a plurality of captured images to the external device for processing at the external device to identify a gesture.

In some embodiments of the disclosure, the user input data is indicative a gesture associated with both the another limb of the user included in one or more of the captured images and the limb of the user wearing the apparatus 200. Using the wearable data processing apparatus 200 worn on a first limb, motion of the first limb and a second limb can both be detected. Motion for the second limb can be detected using one or more captured images including the second limb. Motion associated with the first limb can be detected using motion detected by one or more of the motion sensors and/or motion detected using one or more captured images based on SLAM techniques. For example, a two handed gesture in which both hands simultaneously move in a same direction may be performed for issuing a scrolling command (or a panning command for panning a viewpoint in a given direction). In another example, a two handed gesture in which both hands simultaneously move apart (or together) may be performed for issuing a zoom-in command (or zoom-out command). Therefore, the detected motion of the wearable data processing apparatus 200 and also the detected motion of another limb can be used to identify a predetermined gesture performed using two limbs. In particular, the user input data may be indicative of a two-handed gesture performed by the user.

Hence more generally, in some embodiments of the disclosure a gesture associated with both the another limb of the user included in one or more of the captured images and the limb of the user attached to the wearable data processing apparatus 200 is determined, in which movement of the limb of the user is determined based on motion of the data processing apparatus 200 detected by one or more of the motion sensors and/or one or more of the image sensors, and in which movement of the another limb of the user is determined based on one or more captured images including the another limb of the user. In some examples, a combination of the motion of the wearable data processing apparatus 200 detected by one or more hardware motion sensors and the motion of the another limb detected by one or more image sensors may be used for determining a two-handed gesture being performed by the user.

In some embodiments of the disclosure, the wireless communication circuitry 230 is configured to transmit the user input data to the external device for updating a state of an application to thereby update a virtual avatar based on the user input data. The external device can be configured to execute an application, such as a video game application, in dependence upon the user input data so as to update a virtual avatar based on the user input data. For example, a gesture and/or a user emotion, as discussed above, may be used to update a virtual avatar. In particular, a gesture may be used to update the virtual avatar to perform a corresponding gesture and/or a user emotion may be used to update a face of the virtual avatar with an avatar emotion corresponding to the user emotion. In some examples, a user may wear a plurality of the wearable data processing apparatuses 200, in which a first wearable data processing apparatus is worn on a first arm and a second wearable data processing apparatus is worn on a second arm. Therefore, the external device can be configured to receive user input data from the first wearable data processing apparatus for updating a first limb of the virtual avatar and to receive user input data from the second wearable data processing apparatus for updating a second limb of the virtual avatar. Hence more generally, a respective limb of a virtual avatar can be controlled in dependence upon motion of a respective wearable data processing apparatus 200.

In some embodiments of the disclosure, the one more output signals generated by the processing circuitry 240 comprise at least a first video signal and the output unit 250 comprises a display unit to display one or more images in dependence upon the first video signal. The wireless communication circuitry 230 can be configured to receive the control data from the external device, the processing circuitry 240 can be configured to generate at least a first video signal in dependence upon the control data, and a display unit of the wearable apparatus 200 can be configured to display one or more images in dependence upon the first video signal. The control data may include data for one or more images that are the same as or different from the one or more images generated for display by an external display unit (e.g. display 120). Therefore, in some cases the wearable apparatus 200 is operable to display images corresponding to the images being displayed on the external display unit (e.g. display 130) so that a screen located closer to the user can be used for displaying images to the user. Formatting of the images for display by the display unit of wearable data processing apparatus 200 may optionally be performed so as to enhance the legibility of one or more user interface elements when displayed on the screen of the apparatus 200 to account for the smaller screen size. The display unit of the wearable apparatus 200 may take any suitable shape, such as a circular, square or rectangular shape.

In some embodiments of the disclosure, at least one of the one or more sensors 220 is configured to generate second user input data in response to a second user input corresponding to a switching request from the user, the wireless communication circuitry 230 is configured to transmit the second user input data to the external device and receive second control data based on the second user input data from the external device, and the processing circuitry 240 is configured generate a second video signal in dependence upon the second control data, the second video signal comprising a different content to the first video signal. The processing circuitry 240 is operable to generate a first video signal for outputting a sequence of first images and the user wearing the device 200 can provide a user input (for example, by pressing a button or performing a predetermined gesture, such as a panning gesture using two hands) to request switching to a different sequence of images. Therefore, whilst viewing a first sequence of images displayed by the display unit of the wearable apparatus 200, second user input data can be transmitted to the external device to request a different sequence of images and subsequently the second control data received by the device 200 can be used to generate a second video signal different from the first video signal to display a different sequence of images. The switching request for switching from a first video feed to a second video feed can be performed using any of the input techniques discussed above.

Hence, in some embodiments of the disclosure a data processing system comprises: the wearable data processing apparatus 200; and the external device 110, wherein the external device is an entertainment device configured to: update a state of an application in dependence upon the user input data; and generate the control data in dependence upon the state of the application, and wherein the entertainment device is configured to generate one or more images for display by a display monitor (e.g. display 120) associated with the entertainment device in dependence upon the state of the application, and wherein the control data comprises data for generating at least one of a first image and a second image, wherein the first image and second image include different content and one of the first image and the second image includes a same content as one or more of the images generated for display by the display monitor.

In some examples, the first video signal may correspond to a sequence of images associated with a first viewpoint for a virtual reality environment and the second video signal may correspond to a sequence of images associated with a second viewpoint for the virtual reality environment, the second viewpoint being different from the first viewpoint. The external device may execute the application to generate images for display for a virtual reality environment, and may be operable to generate images for display for a plurality of respective viewpoints for the virtual reality environment. For example, in a multiplayer video game in which players participate in a same virtual reality environment, first images may be generated for following a first player character and second images may be generated for following a second player character. The switching request may be used by the user to switch between such viewpoints. In particular, in the case of a multiplayer online game hosted by a cloud gaming service, the wearable data processing apparatus 200 can communicate the user input data to the cloud gaming service, via one or more intermediate devices, and receive the control data for generating images for display and the switching request can be communicated to request switching of a video feed to follow different players.

In some embodiments of the disclosure, the first video signal comprises content for a viewpoint of a video game corresponding to a playing user, and the second video signal comprises content for a spectator viewpoint of the video game. The application may provide one or more spectator viewpoints for allowing spectators (who do not actively participate in the playing of the video game) to view the virtual environment. In some examples, the spectator viewpoint may have a fixed position and/or orientation with respect to the virtual environment. In other examples, the user input data may allow the user wearing the wearable apparatus 200 to update at least one of a position and an orientation of the spectator viewpoint. For example, a gesture, such as a panning gesture by one or both of the user's limbs, may be used for updating a position and/or orientation of the spectator viewpoint. Therefore, in some examples the external device can be configured to update a state of an application in dependence upon the user data to update at least one of a position and an orientation for a spectator viewpoint and the control data transmitted to the wearable apparatus 200 can be used for generating images for display by the display unit of the apparatus 200, in which the viewpoint for the images is updated accordingly. Alternatively or in addition, the application may provide a plurality of selectable spectator viewpoints such that a user can select a spectator viewpoint from the plurality of selectable spectator viewpoints and images for the selected spectator viewpoint can be displayed by the display unit of the apparatus 200. Therefore, the user may provide a user input corresponding to switching request to switch from a viewpoint for a playing user to a first spectator viewpoint, and may subsequently provide another user input to switch to a second spectator viewpoint.

In some embodiments of the disclosure, the wearable data processing apparatus 200 comprises one or more optically detectable infra-red light sources for camera-based tracking of the wearable data processing apparatus 200. The wearable data processing apparatus 200 may comprise at least one infra-red light source arranged on the external surface which can be suitably detected by an image sensor capable of detecting infra-red light. Referring again to FIG. 3, the camera 130 may for example comprise an image sensor for detecting infra-red light. Therefore, a position and/or orientation of the wearable data processing apparatus 200 may be detected by tracking the infra-red light source in images captured by the image sensor. In some examples, the wearable data processing apparatus 200 comprises a plurality of infra-red light sources arranged in a predetermined configuration. Therefore, a relative arrangement of two or more infra-red light sources in a captured image and knowledge of the predetermined configuration can be used to derive the position and/or orientation of the apparatus 200 with respect to the camera. In particular, the wearable data processing apparatus 200 may comprise a plurality of infra-red light sources positioned relative to each other so as to be separated by a predetermined distance, and a distance of the apparatus 200 with respect to a camera can be derived based on a separation distance of the infra-red light sources in a captured image.

In some embodiments of the disclosure, the output unit 250 comprises one or more from the list consisting of: an audio output unit configured to output one or more audio signals; a display unit configured to display one or more images in dependence upon a video signal; and a haptic interface unit configured to output a haptic interaction in dependence upon a haptic signal. The output unit 250 may comprise one or more audio output units operable to output one or more audio signals. In some cases, the output audio signal may be the same as an audio signal being output to accompany an image displayed by the external display unit (e.g. display unit 120) associated with the external device, so that audio can be output to the user at a location that is closer to the user to thereby improve the user's perception of the audio. For example, for a virtual reality environment in which users are able to provide inputs via microphones to speak to each other, an audio signal comprising a speech for a user may be output by the output unit 250. Optionally, the wearable data processing apparatus 200 comprises a microphone for detecting a speech input by the user wearing the apparatus 200, and user input data comprising speech data can be used for updating the application for allowing the user to communicate with another user of the virtual reality environment. Hence, the wearable data processing apparatus 200 is operable as an input/output device for allowing communication between a user wearing the device and another user, such as another user in a virtual reality environment associated with the application.

As explained previously, the output unit 250 may comprise at least one display unit for displaying one or more images in dependence upon a video signal generated by the processing circuitry 240. Any suitable display technology such as an LCD or OLED display may be used. Alternatively or in addition, the output unit 250 may comprise at least one haptic interface unit comprising one or more actuators to provide a physical interaction with the user in response to a haptic signal generated by the processing circuitry 240. In some examples, the apparatus 200 can be used to control an avatar based on the transmitted user input data. The control data generated by the external device (or an associated device executing the application) can be received for providing a haptic interaction with the user according to a configuration of the avatar relative to a virtual object in the virtual environment. For example the user may control a limb of an avatar to contact a virtual object and a corresponding haptic interaction can be output via the haptic interface unit. In some examples, the actuators are vibration devices which vibrate according to a haptic signal generated by the processing circuitry 240.

Figure 5:
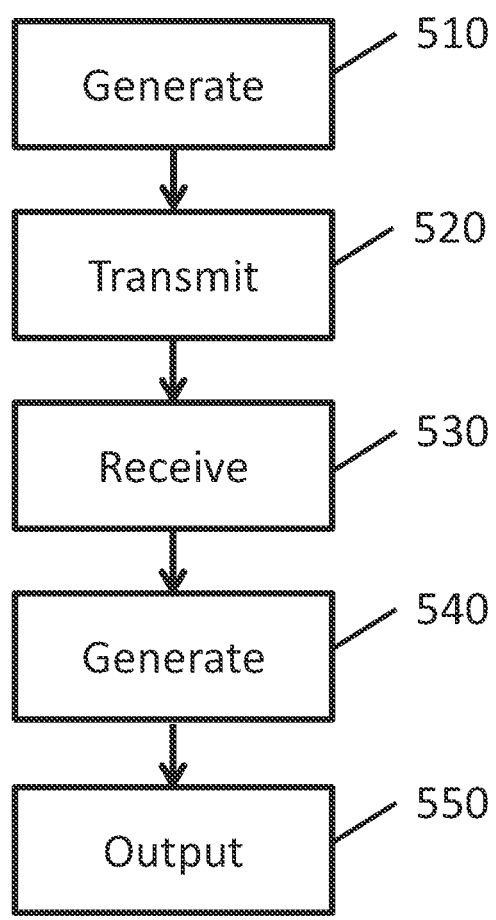
FIG. 5 is a schematic flowchart illustrating a data processing method.

FIG. 5 is a schematic flowchart illustrating a data processing method performed by the wearable data processing apparatus 200 comprising one or more of the attachment members 210 for attaching the wearable data processing apparatus 200 to a part of a limb of a user. The method comprising: generating (at a step 510), by one or more sensors 220, user input data in response to one or more user inputs; transmitting (at a step 520) the user input data to an external device; receiving (at a step 530) control data based on the user input data from the external device; generating (at a step 540) one or more output signals in dependence upon the control data; and outputting (at a step 550) one or more of the output signals.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

Hence the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A wearable data processing apparatus comprising:
one or more attachment members for attaching the wearable data processing apparatus to a part of a limb of a user;
one or more sensors to generate user input data in response to one or more user inputs;
wireless communication circuitry to transmit the user input data to an external device and to receive control data based on the user input data from the external device;
processing circuitry to generate one or more output signals in dependence upon the control data; and
an output unit to output one or more of the output signals, wherein:
the one or more sensors comprise one or more image sensors configured to capture one or more images,
at least one image sensor is configured to capture one or more images including at least one of a torso of the user, a part of another limb of the user and a head of the user, and
the user input data is indicative of one or more of:
a predetermined user emotion selected from a plurality of predetermined user emotions in dependence upon a facial expression of the user in one or more of the captured images;
a gesture associated with the another limb of the user included in one or more of the captured images;
a gesture associated with both the another limb of the user included in one or more of the captured images and the limb of the user;
a movement associated with the torso of the user included in one or more of the captured images; and
a movement associated with the head of the user included in one or more of the captured images.

2. The wearable data processing apparatus according to claim 1, wherein the one or more sensors comprise one or more motion sensors to detect motion of the data processing apparatus.

3. The wearable data processing apparatus according to claim 2, wherein at least one image sensor is configured to capture one or more images for detecting motion of the data processing apparatus.

4. The wearable data processing apparatus according to claim 2, wherein the user input data is indicative of motion of the data processing apparatus detected by one or more of the motion sensors and/or one or more of the image sensors.

5. The wearable data processing apparatus according to claim 1, wherein the wireless communication circuitry is configured to transmit the user input data to the external device for updating a state of an application to thereby update a virtual avatar based on the user input data.

6. The wearable data processing apparatus according to claim 1, wherein the external device is an entertainment device configured to update a state of an application in dependence upon the user input data.

7. The wearable data processing apparatus according to claim 1, wherein the one more output signals comprise at least a first video signal and the output unit comprises a display unit to display one or more images in dependence upon the first video signal.

8. The wearable data processing apparatus according to claim 7, wherein at least one of the one or more sensors is configured to generate second user input data in response to a second user input corresponding to a switching request from the user, the wireless communication circuitry is configured to transmit the second user input data to the external device and receive second control data based on the second user input data from the external device, and the processing circuitry is configured generate a second video signal in dependence upon the second control data, the second video signal comprising a different content to the first video signal.

9. The wearable data processing apparatus according to claim 8, wherein the first video signal comprises content for a viewpoint of a video game corresponding to a playing user, and the second video signal comprises content for a spectator viewpoint of the video game.

10. The wearable data processing apparatus according to claim 1 comprising one or more optically detectable infrared light sources for camera-based tracking of the wearable data processing apparatus.

11. The wearable data processing apparatus according to claim 1, wherein the output unit comprises one or more of:
an audio output unit configured to output one or more audio signals;
a display unit configured to display one or more images in dependence upon a video signal; and
a haptic interface unit configured to output a haptic interaction in dependence upon a haptic signal.

12. A data processing system comprising:
a wearable data processing apparatus having: (i) one or more attachment members for attaching the wearable data processing apparatus to a part of a limb of a user; (ii) one or more sensors to generate user input data in response to one or more user inputs; (iii) wireless communication circuitry to transmit the user input data to an external device and to receive control data based on the user input data from the external device; (iv) processing circuitry to generate one or more output signals in dependence upon the control data; and (v) an output unit to output one or more of the output signals; and
an external device, wherein the external device is an entertainment device configured to:
update a state of an application in dependence upon the user input data; and
generate the control data in dependence upon the state of the application, wherein:
the one or more sensors comprise one or more image sensors configured to capture one or more images,
at least one image sensor is configured to capture one or more images including at least one of a torso of the user, a part of another limb of the user and a head of the user, and
the user input data is indicative of one or more of:
a predetermined user emotion selected from a plurality of predetermined user emotions in dependence upon a facial expression of the user in one or more of the captured images;
a gesture associated with the another limb of the user included in one or more of the captured images;

a gesture associated with both the another limb of the user included in one or more of the captured images and the limb of the user;

a movement associated with the torso of the user included in one or more of the captured images; and a movement associated with the head of the user included in one or more of the captured images.

13. The data processing system according to claim 12, wherein the entertainment device is configured to generate one or more images for display by a display monitor associated with the entertainment device in dependence upon the state of the application, and wherein the control data comprises data for generating at least one of a first image and a second image, wherein the first image and second image include different content and one of the first image and the second image includes a same content as one or more of the images generated for display by the display monitor.

14. A data processing method performed by a wearable data processing apparatus comprising one or more attachment members for attaching the wearable data processing apparatus to a part of a limb of a user, the method comprising:

generating, by one or more sensors, user input data in response to one or more user inputs;

transmitting the user input data to an external device;

receiving control data based on the user input data from the external device;

generating one or more output signals in dependence upon the control data; and outputting one or more of the output signals, wherein:

the one or more sensors comprise one or more image sensors configured to capture one or more images, at least one image sensor is configured to capture one or more images including at least one of a torso of the user, a part of another limb of the user and a head of the user, and the user input data is indicative of one or more of:

a predetermined user emotion selected from a plurality of predetermined user emotions in dependence upon a facial expression of the user in one or more of the captured images;

a gesture associated with the another limb of the user included in one or more of the captured images;

a gesture associated with both the another limb of the user included in one or more of the captured images and the limb of the user;

a movement associated with the torso of the user included in one or more of the captured images; and a movement associated with the head of the user included in one or more of the captured images.

15. A non-transitory computer readable medium having computer software stored thereon which, when executed by a computer, causes the computer to perform a data processing method comprising:

generating, by one or more sensors, user input data in response to one or more user inputs;

transmitting the user input data to an external device;

receiving control data based on the user input data from the external device;

generating one or more output signals in dependence upon the control data; and outputting one or more of the output signals, wherein:

the one or more sensors comprise one or more image sensors configured to capture one or more images, at least one image sensor is configured to capture one or more images including at least one of a torso of the user, a part of another limb of the user and a head of the user, and the user input data is indicative of one or more of:

a predetermined user emotion selected from a plurality of predetermined user emotions in dependence upon a facial expression of the user in one or more of the captured images;

a gesture associated with the another limb of the user included in one or more of the captured images;

a gesture associated with both the another limb of the user included in one or more of the captured images and the limb of the user;

a movement associated with the torso of the user included in one or more of the captured images; and a movement associated with the head of the user included in one or more of the captured images.

* * * * *